(12) United States Patent
Wolrich et al.

(10) Patent No.: US 7,269,179 B2
(45) Date of Patent: Sep. 11, 2007

(54) CONTROL MECHANISMS FOR ENQUEUE AND DEQUEUE OPERATIONS IN A PIPELINED NETWORK PROCESSOR

(75) Inventors: Gilbert Wolrich, Framingham, MA (US); Mark B. Rosenbluth, Uxbridge, MA (US); Debra Bernstein, Sudbury, MA (US); Matthew J. Adiletta, Worcester, MA (US)

(73) Assignee: Intel Corporation, Santa Clara, CA (US)

( * ) Notice: Subject to any disclaimer, the term of this patent is extended or adjusted under 35 U.S.C. 154(b) by 906 days.

(21) Appl. No.: 10/024,657

(22) Filed: Dec. 18, 2001

(65) Prior Publication Data

US 2003/0115347 A1 Jun. 19, 2003

(51) Int. Cl.
*H04L 12/56* (2006.01)

(52) U.S. Cl. .................. 370/412; 370/428; 711/129; 711/140

(58) Field of Classification Search ............... 370/412; 711/104, 118; 709/314
See application file for complete search history.

(56) References Cited

U.S. PATENT DOCUMENTS

| | | | |
|---|---|---|---|
| 3,373,408 A | 3/1968 | Ling | |
| 3,478,322 A | 11/1969 | Evans | |
| 3,792,441 A | 2/1974 | Wymore et al. | |
| 3,940,745 A | 2/1976 | Sajeva | |
| 4,130,890 A | 12/1978 | Adam | |
| 4,400,770 A | 8/1983 | Chan et al. | |
| 4,514,807 A | 4/1985 | Nogi | |
| 4,523,272 A | 6/1985 | Fukunaga et al. | |
| 4,745,544 A | 5/1988 | Renner et al. | |
| 4,866,664 A | 9/1989 | Burkhardt, Jr. et al. | |
| 5,140,685 A | 8/1992 | Sipple et al. | |
| 5,142,683 A | 8/1992 | Burkhardt, Jr. et al. | |
| 5,155,831 A | 10/1992 | Emma et al. | |
| 5,155,854 A | 10/1992 | Flynn et al. | |
| 5,168,555 A | 12/1992 | Byers et al. | |
| 5,173,897 A | 12/1992 | Schrodi et al. | |
| 5,185,861 A | 2/1993 | Valencia | |
| 5,255,239 A | 10/1993 | Taborn et al. | |
| 5,263,169 A | 11/1993 | Genusov et al. | |
| 5,268,900 A | 12/1993 | Hluchyj et al. | |

(Continued)

FOREIGN PATENT DOCUMENTS

EP 0 379 709 8/1990

(Continued)

OTHER PUBLICATIONS

U.S. Appl. No. 09/475,614, filed Dec. 30, 1999, Wolrich et al.

(Continued)

*Primary Examiner*—Hassan Kizou
*Assistant Examiner*—Jay P. Patel
(74) *Attorney, Agent, or Firm*—Fish & Richardson P.C.

(57) ABSTRACT

Common control for enqueue and dequeue operations in a pipelined network processor includes receiving in a queue manager a first enqueue or dequeue with respect to a queue and receiving a second enqueue or dequeue request in the queue manager with respect to the queue. Processing of the second request is commenced prior to completion of processing the first request.

14 Claims, 7 Drawing Sheets

U.S. PATENT DOCUMENTS

| | | |
|---|---|---|
| 5,347,648 A | 9/1994 | Stamm et al. |
| 5,367,678 A | 11/1994 | Lee et al. |
| 5,390,329 A | 2/1995 | Gaertner et al. |
| 5,392,391 A | 2/1995 | Caulk, Jr. et al. |
| 5,392,411 A | 2/1995 | Ozaki |
| 5,392,412 A | 2/1995 | McKenna |
| 5,404,464 A | 4/1995 | Bennett |
| 5,404,482 A | 4/1995 | Stamm et al. |
| 5,432,918 A | 7/1995 | Stamm |
| 5,448,702 A | 9/1995 | Garcia, Jr. et al. |
| 5,450,351 A | 9/1995 | Heddes |
| 5,452,437 A | 9/1995 | Richey et al. |
| 5,459,842 A | 10/1995 | Begun et al. |
| 5,463,625 A | 10/1995 | Yasrebi |
| 5,467,452 A | 11/1995 | Blum et al. |
| 5,517,648 A | 5/1996 | Bertone et al. |
| 5,542,070 A | 7/1996 | LeBlanc et al. |
| 5,542,088 A | 7/1996 | Jennings, Jr. et al. |
| 5,544,236 A | 8/1996 | Andruska et al. |
| 5,550,816 A | 8/1996 | Hardwick et al. |
| 5,557,766 A | 9/1996 | Takiguchi et al. |
| 5,568,617 A | 10/1996 | Kametani |
| 5,574,922 A | 11/1996 | James |
| 5,592,622 A | 1/1997 | Isfeld et al. |
| 5,613,071 A | 3/1997 | Rankin et al. |
| 5,613,136 A | 3/1997 | Casavant et al. |
| 5,623,489 A | 4/1997 | Cotton et al. |
| 5,627,829 A | 5/1997 | Gleeson et al. |
| 5,630,130 A | 5/1997 | Perotto et al. |
| 5,634,015 A | 5/1997 | Chang et al. |
| 5,644,623 A | 7/1997 | Gulledge |
| 5,649,092 A * | 7/1997 | Price et al. .................. 714/15 |
| 5,649,157 A | 7/1997 | Williams |
| 5,659,687 A | 8/1997 | Kim et al. |
| 5,671,446 A | 9/1997 | Rakity et al. |
| 5,680,641 A | 10/1997 | Sidman |
| 5,684,962 A | 11/1997 | Black et al. |
| 5,689,566 A | 11/1997 | Nguyen |
| 5,699,537 A | 12/1997 | Sharangpani et al. |
| 5,717,898 A | 2/1998 | Kagan et al. |
| 5,721,870 A | 2/1998 | Matsumoto |
| 5,742,587 A | 4/1998 | Zornig et al. |
| 5,742,782 A | 4/1998 | Ito et al. |
| 5,742,822 A | 4/1998 | Motomura |
| 5,745,913 A | 4/1998 | Pattin et al. |
| 5,751,987 A | 5/1998 | Mahant Shetti et al. |
| 5,761,507 A | 6/1998 | Govett |
| 5,761,522 A | 6/1998 | Hisanaga et al. |
| 5,781,774 A | 7/1998 | Krick |
| 5,784,649 A | 7/1998 | Begur et al. |
| 5,784,712 A | 7/1998 | Byers et al. |
| 5,796,413 A | 8/1998 | Shipp et al. |
| 5,797,043 A | 8/1998 | Lewis et al. |
| 5,809,235 A | 9/1998 | Sharma et al. |
| 5,809,530 A | 9/1998 | Samra et al. |
| 5,812,868 A | 9/1998 | Moyer et al. |
| 5,828,746 A | 10/1998 | Ardon |
| 5,828,863 A | 10/1998 | Barrett et al. |
| 5,832,215 A | 11/1998 | Kato et al. |
| 5,835,755 A | 11/1998 | Stellwagen, Jr. |
| 5,850,395 A | 12/1998 | Hauser et al. |
| 5,854,922 A | 12/1998 | Gravenstein et al. |
| 5,860,158 A | 1/1999 | Pai et al. |
| 5,872,769 A | 2/1999 | Caldara et al. |
| 5,873,089 A | 2/1999 | Regache |
| 5,886,992 A | 3/1999 | Raatikainen et al. |
| 5,887,134 A | 3/1999 | Ebrahim |
| 5,890,208 A | 3/1999 | Kwon |
| 5,892,979 A | 4/1999 | Shiraki et al. |
| 5,893,162 A | 4/1999 | Lau et al. |
| 5,905,876 A | 5/1999 | Pawlowski et al. |
| 5,905,889 A | 5/1999 | Wilhelm, Jr. |
| 5,915,123 A | 6/1999 | Mirsky et al. |
| 5,937,187 A | 8/1999 | Kosche et al. |
| 5,938,736 A | 8/1999 | Muller et al. |
| 5,940,612 A | 8/1999 | Brady et al. |
| 5,940,866 A | 8/1999 | Chisholm et al. |
| 5,946,487 A | 8/1999 | Dangelo |
| 5,948,081 A | 9/1999 | Foster |
| 5,958,031 A | 9/1999 | Kim |
| 5,961,628 A | 10/1999 | Nguyen et al. |
| 5,970,013 A | 10/1999 | Fischer et al. |
| 5,974,518 A | 10/1999 | Nogradi |
| 5,978,838 A | 11/1999 | Mohamed et al. |
| 5,983,274 A | 11/1999 | Hyder et al. |
| 6,012,151 A | 1/2000 | Mano |
| 6,014,729 A | 1/2000 | Lannan et al. |
| 6,023,742 A | 2/2000 | Ebeling et al. |
| 6,058,168 A | 5/2000 | Braband |
| 6,067,585 A | 5/2000 | Hoang |
| 6,070,231 A | 5/2000 | Ottinger |
| 6,072,781 A | 6/2000 | Feeney et al. |
| 6,073,215 A | 6/2000 | Snyder |
| 6,079,008 A | 6/2000 | Clery, III |
| 6,085,215 A | 7/2000 | Ramakrishnan et al. |
| 6,085,217 A * | 7/2000 | Ault et al. .................. 718/105 |
| 6,085,294 A | 7/2000 | Van Doren et al. |
| 6,092,127 A | 7/2000 | Tausheck |
| 6,092,158 A | 7/2000 | Harriman et al. |
| 6,112,016 A | 8/2000 | MacWilliams et al. |
| 6,134,665 A | 10/2000 | Klein et al. |
| 6,141,689 A | 10/2000 | Yasrebi |
| 6,141,765 A | 10/2000 | Sherman |
| 6,144,669 A | 11/2000 | Williams et al. |
| 6,145,054 A | 11/2000 | Mehrotra et al. |
| 6,157,955 A | 12/2000 | Narad et al. |
| 6,160,562 A | 12/2000 | Chin et al. |
| 6,182,177 B1 | 1/2001 | Harriman |
| 6,195,676 B1 | 2/2001 | Spix et al. |
| 6,199,133 B1 | 3/2001 | Schnell |
| 6,201,807 B1 | 3/2001 | Prasanna |
| 6,212,542 B1 | 4/2001 | Kahle et al. |
| 6,212,611 B1 | 4/2001 | Nizar et al. |
| 6,216,220 B1 | 4/2001 | Hwang |
| 6,223,207 B1 | 4/2001 | Lucovsky et al. |
| 6,223,238 B1 | 4/2001 | Meyer et al. |
| 6,223,279 B1 | 4/2001 | Nishimura et al. |
| 6,247,025 B1 | 6/2001 | Bacon |
| 6,256,713 B1 | 7/2001 | Audityan et al. |
| 6,272,616 B1 | 8/2001 | Fernando et al. |
| 6,275,505 B1 | 8/2001 | O Loughlin et al. |
| 6,279,113 B1 | 8/2001 | Vaidya |
| 6,289,011 B1 | 9/2001 | Seo et al. |
| 6,298,370 B1 | 10/2001 | Tang et al. |
| 6,307,789 B1 | 10/2001 | Wolrich et al. |
| 6,320,861 B1 | 11/2001 | Adam et al. |
| 6,324,624 B1 | 11/2001 | Wolrich et al. |
| 6,345,334 B1 | 2/2002 | Nakagawa et al. |
| 6,347,341 B1 | 2/2002 | Glassen et al. |
| 6,347,344 B1 | 2/2002 | Baker et al. |
| 6,351,474 B1 | 2/2002 | Robinett et al. |
| 6,356,962 B1 | 3/2002 | Kasper et al. |
| 6,359,911 B1 | 3/2002 | Movshovich et al. |
| 6,360,262 B1 | 3/2002 | Guenthner et al. |
| 6,373,848 B1 | 4/2002 | Allison et al. |
| 6,385,658 B2 | 5/2002 | Harter et al. |
| 6,389,449 B1 | 5/2002 | Nemirovsky et al. |
| 6,393,483 B1 | 5/2002 | Latif et al. |
| 6,393,531 B1 | 5/2002 | Novak et al. |
| 6,415,338 B1 | 7/2002 | Habot |
| 6,426,940 B1 | 7/2002 | Seo et al. |
| 6,426,957 B1 | 7/2002 | Hauser et al. |
| 6,427,196 B1 | 7/2002 | Adiletta et al. |
| 6,430,626 B1 | 8/2002 | Witkowski et al. |

| | | |
|---|---|---|
| 6,434,145 B1 | 8/2002 | Opsasnick et al. |
| 6,438,651 B1 * | 8/2002 | Slane .................... 711/118 |
| 6,463,072 B1 | 10/2002 | Wolrich et al. |
| 6,470,415 B1 * | 10/2002 | Starr et al. ............... 711/104 |
| 6,522,188 B1 | 2/2003 | Poole |
| 6,523,060 B1 | 2/2003 | Kao |
| 6,532,509 B1 | 3/2003 | Wolrich et al. |
| 6,539,024 B1 | 3/2003 | Janoska et al. |
| 6,552,826 B2 | 4/2003 | Adler et al. |
| 6,560,667 B1 | 5/2003 | Wolrich et al. |
| 6,577,542 B2 | 6/2003 | Wolrich et al. |
| 6,584,522 B1 | 6/2003 | Wolrich et al. |
| 6,587,906 B2 | 7/2003 | Wolrich et al. |
| 6,606,704 B1 | 8/2003 | Adiletta et al. |
| 6,625,654 B1 | 9/2003 | Wolrich et al. |
| 6,631,430 B1 | 10/2003 | Wolrich et al. |
| 6,631,462 B1 | 10/2003 | Wolrich et al. |
| 6,658,546 B2 * | 12/2003 | Calvignac et al. .......... 711/170 |
| 6,661,794 B1 | 12/2003 | Wolrich et al. |
| 6,667,920 B2 | 12/2003 | Wolrich et al. |
| 6,668,317 B1 | 12/2003 | Bernstein et al. |
| 6,681,300 B2 | 1/2004 | Wolrich et al. |
| 6,684,303 B2 | 1/2004 | LaBerge |
| 6,687,247 B1 * | 2/2004 | Wilford et al. ............. 370/392 |
| 6,694,380 B1 | 2/2004 | Wolrich et al. |
| 6,724,721 B1 | 4/2004 | Cheriton |
| 6,728,845 B2 | 4/2004 | Adiletta et al. |
| 6,731,596 B1 * | 5/2004 | Chiang et al. ............. 370/217 |
| 6,754,223 B1 * | 6/2004 | Lussier et al. ............. 370/412 |
| 6,757,791 B1 | 6/2004 | O'Grady et al. |
| 6,768,717 B1 | 7/2004 | Reynolds et al. |
| 6,779,084 B2 | 8/2004 | Wolrich et al. |
| 6,791,989 B1 * | 9/2004 | Steinmetz et al. .......... 370/412 |
| 6,795,447 B2 * | 9/2004 | Kadambi et al. ........... 370/412 |
| 6,804,239 B1 * | 10/2004 | Lussier et al. ............. 370/392 |
| 6,810,426 B2 | 10/2004 | Mysore et al. |
| 6,813,249 B1 | 11/2004 | Lauffenburger et al. |
| 6,816,498 B1 * | 11/2004 | Viswanath ................ 370/412 |
| 6,822,958 B1 | 11/2004 | Branth et al. |
| 6,822,959 B2 * | 11/2004 | Galbi et al. ............... 370/392 |
| 6,839,748 B1 * | 1/2005 | Allavarpu et al. .......... 709/223 |
| 6,842,457 B1 * | 1/2005 | Malalur .................... 370/428 |
| 6,848,023 B2 * | 1/2005 | Teramoto .................. 711/127 |
| 6,850,999 B1 * | 2/2005 | Mak et al. ................. 710/39 |
| 6,868,087 B1 * | 3/2005 | Agarwala et al. .......... 370/412 |
| 6,888,830 B1 * | 5/2005 | Snyder, II et al. .......... 370/392 |
| 6,975,637 B1 | 12/2005 | Lenell |
| 7,092,393 B1 * | 8/2006 | Westbrook et al. ......... 370/394 |
| 2001/0014100 A1 | 8/2001 | Abe et al. |
| 2002/0131443 A1 | 9/2002 | Robinett et al. |
| 2002/0144006 A1 | 10/2002 | Cranston et al. |
| 2002/0196778 A1 | 12/2002 | Colmant et al. |
| 2003/0041216 A1 | 2/2003 | Rosenbluth et al. |
| 2003/0046488 A1 | 3/2003 | Rosenbluth et al. |
| 2003/0067874 A1 * | 4/2003 | See et al. ................ 370/230.1 |
| 2003/0110166 A1 | 6/2003 | Wolrich et al. |
| 2003/0115347 A1 | 6/2003 | Wolrich et al. |
| 2003/0115426 A1 | 6/2003 | Rosenbluth et al. |
| 2003/0131022 A1 | 7/2003 | Wolrich et al. |
| 2003/0131198 A1 | 7/2003 | Wolrich et al. |
| 2003/0140196 A1 | 7/2003 | Wolrich et al. |
| 2003/0147409 A1 | 8/2003 | Wolrich et al. |
| 2004/0039895 A1 | 2/2004 | Wolrich et al. |
| 2004/0054880 A1 | 3/2004 | Bernstein et al. |
| 2004/0071152 A1 | 4/2004 | Wolrich et al. |
| 2004/0073728 A1 | 4/2004 | Wolrich et al. |
| 2004/0073778 A1 | 4/2004 | Adiletta et al. |
| 2004/0098496 A1 | 5/2004 | Wolrich et al. |
| 2004/0109369 A1 | 6/2004 | Wolrich et al. |
| 2004/0179533 A1 | 9/2004 | Donovan |

FOREIGN PATENT DOCUMENTS

| | | |
|---|---|---|
| EP | 0 418 447 | 3/1991 |
| EP | 0 464 715 | 1/1992 |
| EP | 0 633 678 | 1/1995 |
| EP | 0 745 933 | 12/1996 |
| EP | 0 760 501 | 3/1997 |
| EP | 0 809 180 | 11/1997 |
| JP | 59111533 | 6/1984 |
| WO | WO94/15287 | 7/1994 |
| WO | WO97/38372 | 10/1997 |
| WO | WO98/25210 | 6/1998 |
| WO | WO 01/50679 | 1/2001 |
| WO | WO 01/15718 | 3/2001 |
| WO | WO 01/16769 | 3/2001 |
| WO | WO 01/16770 | 3/2001 |
| WO | WO 01/16782 | 3/2001 |
| WO | WO 01/48596 | 7/2001 |
| WO | WO 01/48606 | 7/2001 |
| WO | WO 01/48619 | 7/2001 |
| WO | WO 01/50247 | 7/2001 |
| WO | WO 03/017541 | 2/2003 |

OTHER PUBLICATIONS

U.S. Appl. No. 09/473,571, filed Dec. 28, 1999, Wolrich et al.

Byrd et al., "Multithread Processor Architectures," *IEEE Spectrum*, vol. 32, No. 8, New York, Aug. 1, 1995, pp. 38-46.

Doyle et al., *Microsoft Press Computer Dictionary*, 2nd ed., Microsoft Press, Redmond, Washington, USA, 1994, p. 326.

Fillo et el., "The M-Machine Multicomputer," IEEE Proceedings of MICRO-28, 1995, pp. 146-156.

Gomez et al., "Efficient Multithreaded User-Space Transport for Network Computing: Design and Test of the TRAP Protocol," *Journal of Parallel and Distributed Computing*, Academic Press, Duluth, Minnesota, USA, vol. 40, No. 1, Jan. 10, 1997, pp. 103-117.

Haug et al., "Reconfigurable hardware as shared resource for parallel threads," IEEE Symposium on FPGAs for Custom Computing Machines, 1998.

Hauser et al., "Garp: a MIPS processor with a reconfigurable coprocessor," Proceedings of the 5th Annual IEEE Symposium on Field-Programmable Custom Computing Machines, 1997.

Hyde, R., "Overview of Memory Management," *Byte*, vol. 13, No. 4, 1998, pp. 219-225.

Litch et al., "StrongARMing Portable Communications," IEEE Micro, 1998, pp. 48-55.

Schmidt et al., "The Performance of Alternative Threading Architectures for Parallel Communication Subsystems," Internet Document, *Online!*, Nov. 13, 1998.

Thistle et al., "A Processor Architecture for Horizon," IEEE, 1998, pp. 35-41.

Tremblay et al., "A Three Dimensional Register File for Superscalar Processors," IEEE Proceedings of the 28th Annual Hawaii International Conference on System Sciences, 1995, pp. 191-201.

Trimberger et al, "A time-multiplexed FPGA," Proceedings of the 5th Annual IEEE Symposium on Field-Programmable Custom Computing Machines, 1998.

Turner et al., "Design of a High Performance Active Router," Internet Document, *Online*, Mar. 18, 1999.

Vibhatavanijt et al., "Simultaneous Multithreading-Based Routers," Proceedings of the 2000 International Conference of Parallel Processing, Toronto, Ontario, Canada, Aug. 21-24, 2000, pp. 362-359.

Wazlowski et al., "PRSIM-II computer and architecture," IEEE Proceedings, Workshop on FPGAs for Custom Computing Machines, 1993.

Adiletta, et al., "The next generation of Intel IXP Network Processors", Intel Technology Journal, Network Processors, vol. 6, issue 3, published Aug. 15, 2002, pp. 6-18.

Brewer, et al., "Remote Queues: Exposing Message Queues for Optimization and Atomicity", SPAA '95 Santa Barbara, CA, pp. 1-13.

Buyuktosunoglu, A., et al., "Tradeoffs in Power-Efficient Issue Queue Design", ISLPED '02, ACM, Aug. 2002, 6 pages.

Dandamudi, S., "Multiprocessors", IEEE Computer, Mar. 1997, pp. 82-89.

Hendler, D., et al., "Work Dealing", SPAA '02, ACM, Aug. 2002, pp. 164-172.

Jonkers, H., "Queueing Models of Shared-Memory Parallel Applications", Computer and Telecommunications Systems Performance Engineering, Pentech Press, London, 1994, 13 pages.

Komaros, et al., "A Fully-Programmable Memory Management System Optimizing Queue Handling at Multi Gigabit Rates", ACM, Jun. 2-6, 2003, pp. 54-59.

Kumar, S., et al., "Scalable, Cache-Based Queue Management Subsystem for Network Processors", no date, pp. 1-7.

Lymar, T., et al., "Data Streams Organization in Query Executor for Parallel DBMS", no date, 4 pages.

McLuckie, L., et al., "Using the RapidIO Messaging Unit on PowerQUICC III", Freescale Semiconductor, Inc., 2004 Rev. 1, pp. 1-19.

Michael, M., "Scalable Lock-Free Dynamic Memory Allocation", PLDI '04, ACM, Jun. 2004, pp. 1-12.

Pan, H., et al. ,"Heads and Tails: A Variable-Length Instruction Format Supporting Parallel Fetch and Decode", CASES 01, No. 16-17, 2001, 8 pages.

Scott, M., "Non-Blocking Timeout in Scalable Queue-Based Spin Locks", PODC '02, ACM, Jul. 2002, pp. 31-40.

* cited by examiner

CONTROL MECHANISMS FOR ENQUEUE AND DEQUEUE OPERATIONS IN A PIPELINED NETWORK PROCESSOR

BACKGROUND

This invention relates to control mechanisms for enqueue and dequeue operations in a pipelined network processor.

A network processor should be able to store newly received packets to a memory structure at a rate at least as high as the arrival time of the packets. To avoid dropping packets and still maintain system throughput, a packet should be removed from memory and also transmitted at the packet arrival rate. Thus, in the time it takes for a packet to arrive, the processor must perform two operations: a store operation and a retrieve from memory operation. The ability to support a large number of queues in an efficient manner is essential for a network processor connected to a high line rate network.

System designs based on ring data structures use statically allocated memory addresses for packet buffering and may be limited in the number of queues that can be supported. Systems that use linked lists are more flexible and allow for a large number of queues. However, linked list queues typically involve locking access to a queue descriptor and queue pointers when a dequeue request is made while an enqueue operation is in progress. Similarly, access to a queue descriptor and queue pointers is typically locked when an enqueue request is made while a dequeue operation is in progress or when near simultaneous enqueue operations or near simultaneous dequeue operations are made to the same queues. Therefore, for network processors connected to high line rates when the network traffic is being directed at a small subset of the available queues, the latency to enqueue or dequeue packets from the same queue may be too great using atomic memory operators.

DETAILED DESCRIPTION

Figure 1:
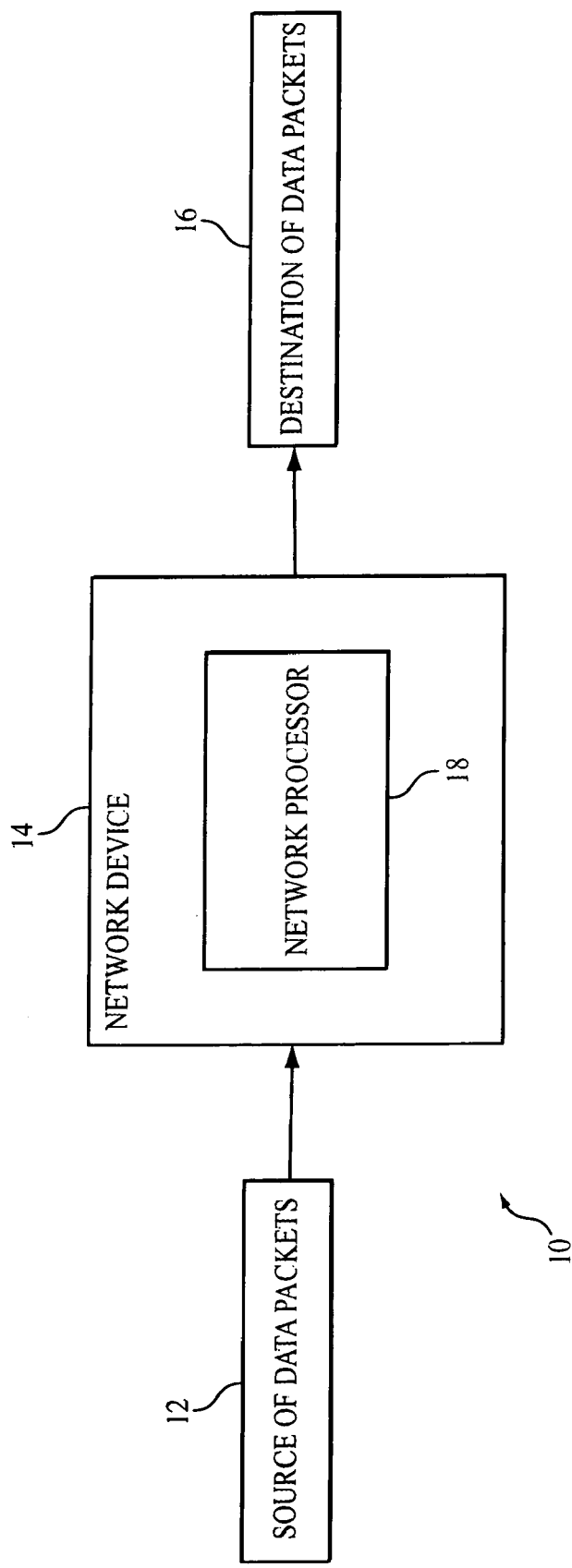
FIG. 1 illustrates a system that includes a pipelined network processor.

Referring to FIG. 1, a network system 10 for processing data packets includes a source of data packets 12 coupled to an input of a network device 14. An output of the network device 14 is coupled to a destination of data packets 16. The network device 14 can include a network processor 18 with memory data structures configured to store and forward the data packets efficiently to a specified destination. Network device 14 can include a network switch, a network router or other network device. The source of data packets 12 can include other network devices connected over a communications path operating at high data packet transfer line speeds such as an optical carrier line (e.g., OC-192), 10 Gigabit line, or other line speeds. The destination of data packets 16 can include a similar network connection.

Figure 2:
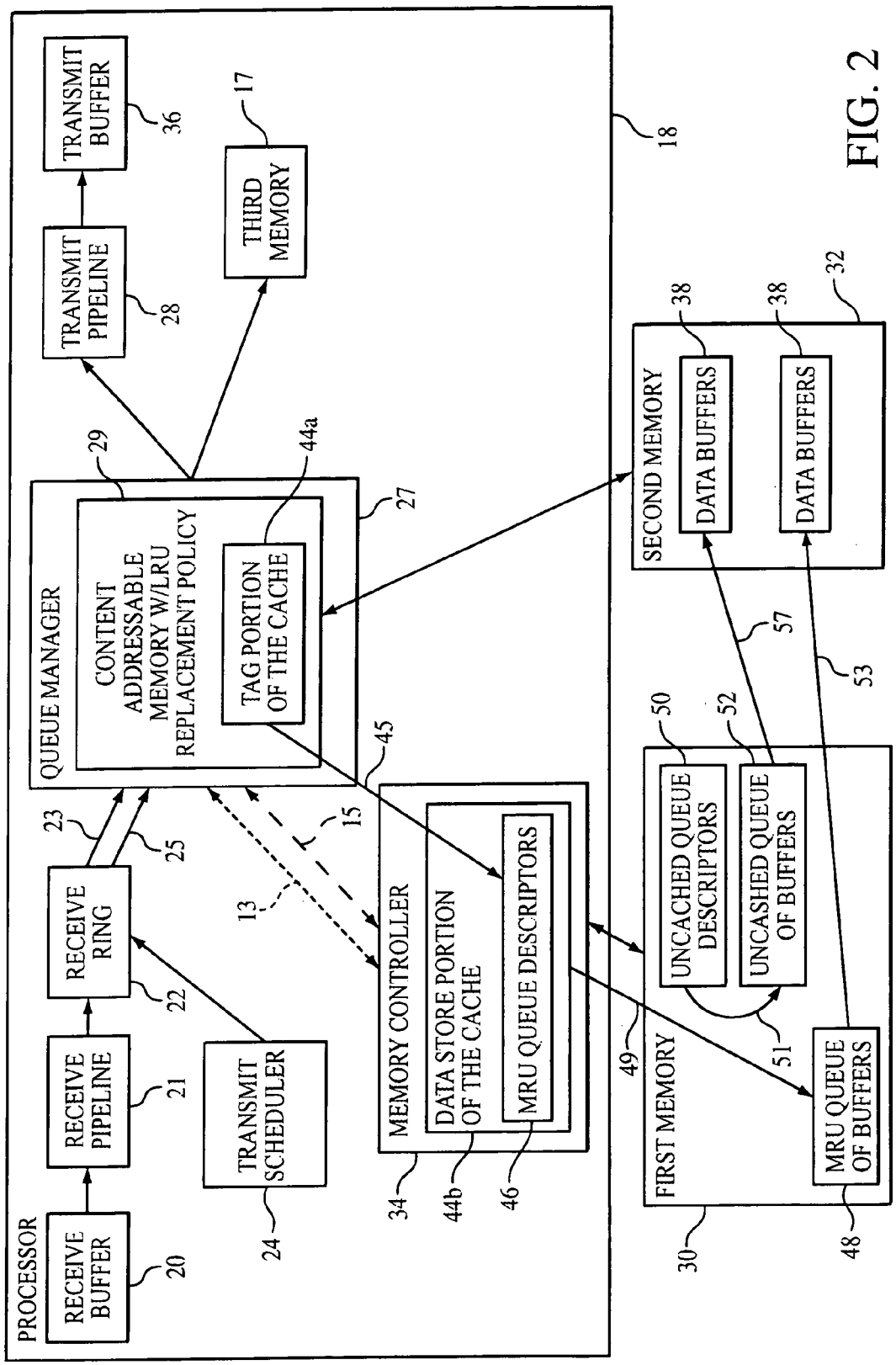
FIG. 2 illustrates a pipelined network processor.

Referring to FIG. 2, the network processor 18 has multiple programming engines that function as a receive pipeline 21, a transmit scheduler 24, a queue manager 27 and a transmit pipeline 28. Each programming engine contains a multiple-entry content addressable memory (CAM) to track N of the most recently used queue descriptors where N represents the number of entries contained in the CAM. For example, the queue manager 27 includes the CAM 29. The network processor 18 includes a memory controller 34 that is coupled to a first 30 and second memory 32, and a third memory 17 containing software instructions for causing the engines to operate as discussed in detail below. The memory controller 34 initiates queue commands in the order in which they are received and exchanges data with the queue manager 27. The first memory 30 has a memory space for storing data. The second memory 32 can be coupled to the queue manager 27 and other components of the network processor 18. As shown in FIG. 2, the first memory 30 and the second memory 32 reside externally to the network processor 18. Alternatively, the first memory 30 and/or the second memory 32 can be internal to the network processor 18. The processor 18 also includes hardware interfaces to a receive bus and a transmit bus that are coupled to receive and transmit buffers 20, 36.

A receive buffer 20 is configured to buffer data packets received from the source of data packets 12. Each data packet can contain a real data portion representing the actual data being sent to the destination, a source data portion representing the network address of the source of the data, and a destination data portion representing the network address of the destination of the data. The receive pipeline 21 is coupled to the output of the receive buffer 20. The receive pipeline 21 also is coupled to a receive ring 22, which may have a first-in-first-out (FIFO) data structure. The receive ring 22 is coupled to the queue manager 27.

The receive pipeline 21 makes enqueue requests 23 to the queue manager 27 through the receive ring 22. The receive pipeline 21 can include multiple multi-threaded programming engines working in a pipelined manner. The engines receive packets, classify them, and store them on an output queue based on the classification. The receive processing determines an output queue for each packet. By pipelining, the programming engine can perform the first stage of execution of an instruction and when the instruction passes to the next stage, a new instruction can be started. The processor does not have to lie idle while waiting for all steps of the first instruction to be completed. Therefore, pipelining can lead to improvements in system performance.

The receive pipeline 21 can be configured to process the data packets from the receive buffer 20 and store the data packets in a data buffer 38 in the memory 32. Once the data packets are processed, the receive pipeline 21 generates enqueue requests 23 directed to the queue manager 27. Each enqueue request represents a request to append a newly received buffer to the last buffer in a queue of buffers 48 in the first memory 30. The receive pipeline 21 can buffer several packets before generating the enqueue requests. Consequently, the total number of enqueue requests generated can be reduced.

The transmit scheduler 24 is coupled to the queue manager 27 and is responsible for generating dequeue requests 25 based on specified criteria. Such criteria can include the time when the number of buffers in a particular queue of buffers reaches a predetermined level. The transmit scheduler 24 determines the order of packets to be transmitted. Each dequeue request 25 represents a request to remove the first buffer from a queue 48 (discussed in greater detail below). The transmit scheduler 24 also may include scheduling algorithms for generating dequeue requests 25 such as "round robin", priority based or other scheduling algorithms. The transmit scheduler 24 may be configured to use congestion avoidance techniques such as random early detection (RED), which involves calculating statistics for the packet traffic. The transmit scheduler maintains a bit for each queue signifying whether the queue is empty or not.

The queue manager 27, which can include, for example, a single multi-threaded programming engine, processes enqueue requests from the receive pipeline 21 as well as dequeue requests from the transmit scheduler 24. The enqueue requests made by the receive pipeline and the dequeue requests made by the transmit scheduler may be present on the receive ring 22 before they are processed by the queue manager 27. The queue manager 27 allows for dynamic memory allocation by maintaining linked list data structures for each queue.

The queue manager 27 contains software components configured to manage a cache of data structures that describe the queues ("queue descriptors"). The cache has a tag portion 44a and a data store portion 44b. The tag portion 44a of the cache resides in the queue manager 27, and the data store portion 44b of the cache resides in a memory controller 34. The tag portion 44a is managed by the CAM 29 which can include hardware components configured to implement a cache entry replacement policy such as a least recently used (LRU) policy. The tag portion of each entry in the cache references one of the last N queue descriptors used to enqueue and dequeue packets by storing as a CAM entry that queue descriptor's location in memory, where N is the number of entries in the CAM. The corresponding queue descriptor is stored in the data store portion 44b of the memory controller 34 at the address entered in the CAM. The actual data placed on the queue is stored in the second memory 32.

The queue manager 27 can alternately service enqueue and dequeue requests. Each enqueue request references a tail pointer of an entry in the data store portion 44b. Each dequeue request references a head pointer of an entry in the data store portion 44b. Because the cache contains valid updated queue descriptors, the need to lock access to a queue descriptor 48a can be eliminated when near simultaneous enqueue and dequeue operations to the same queue are required. Therefore, the atomic accesses and latency that accompany locking can be avoided.

The data store portion 44b maintains a certain number of the most recently used (MRU) queue descriptors 46. Each queue descriptor includes pointers 49 to a corresponding MRU queue of buffers 48. In one implementation, the number of MRU queue descriptors 46 in the data store portion 44b is sixteen. Each MRU queue descriptor 46 is referenced by a set of pointers 45 residing in the tag portion 44a. In addition, each MRU queue descriptor 46 can be associated with a unique identifier so that it can be identified easily. Each MRU queue 48 has pointers 53 to the data buffers 38 residing in the second memory 32. Each data buffer 38 may contain multiple data packets that have been processed by the receive buffer 20.

The uncached queue descriptors 50 reside in the first memory 30 and are not currently referenced by the data store portion 44b. Each uncached queue descriptor 50 also is associated with a unique identifier. In addition, each uncached queue descriptor 50 includes pointers 51 to a corresponding uncached queue of buffers 52. In turn, each uncached queue 52 contains pointers 57 to data buffers 38 residing in the second memory 32.

Each enqueue request can include an address pointing to the data buffer 38 associated with the corresponding data packets. In addition, each enqueue or dequeue request includes an identifier specifying either an uncached queue descriptor 50 or a MRU queue descriptor 46 associated with the data buffer 38.

In response to receiving an enqueue request, the queue manager 27 generates an enqueue command 13 directed to the memory controller 34. The enqueue command 13 may include information specifying a MRU queue descriptor 46 residing in the data store portion 44b. In that case using the pointer 49, the queue 48 is updated to point to the data buffer 38 containing the received data packet. In addition, the MRU queue descriptor 46 is updated to reflect the state of the MRU queue 48. The MRU queue descriptor 46 can be updated quickly and efficiently because the queue descriptor is already in the data store portion 44b.

If the enqueue command 13 includes a queue identifier specifying a queue descriptor which is not a MRU queue descriptor 46, the queue manager 27 replaces a particular MRU queue descriptor 46 with the uncached queue descriptor 50. As a result, the uncached queue descriptor 50 and the corresponding uncached queue of buffers 52 are referenced by the data store portion 44b. In addition, the newly referenced uncached queue 52 associated with the uncached queue descriptor 50 is updated to point to the data buffer 38 storing the received data packet.

In response to receiving a dequeue request 25, the queue manager 27 generates a dequeue command 15 directed to the memory controller 34. As with the enqueue commands 13 discussed above, each dequeue command 15 includes information specifying a queue descriptor. If a MRU queue descriptor 46 is specified, then data buffers 38 pointed to by a corresponding pointer 53 are returned to the queue manager 27 for further processing. The queue 48 is updated and no longer points to the returned data buffer 38 because it is no longer referenced by the data store portion 44b.

The dequeue command 15 may include a queue descriptor which is not a MRU queue descriptor. In that case, the queue manager 27 replaces a particular MRU queue descriptor with the uncached queue descriptor. The replaced queue descriptor is written back to the first memory 30. As a result, the replacement MRU queue descriptor 46 and the corresponding MRU queue 48 are referenced by the data store portion 44b. The data buffer 38 pointed to by the queue 48 is returned to the queue manager 27 for further processing. The MRU queue buffer 48 is updated and no longer points to the data buffer 38 because it is no longer referenced by the data store portion 44b.

Figure 3:
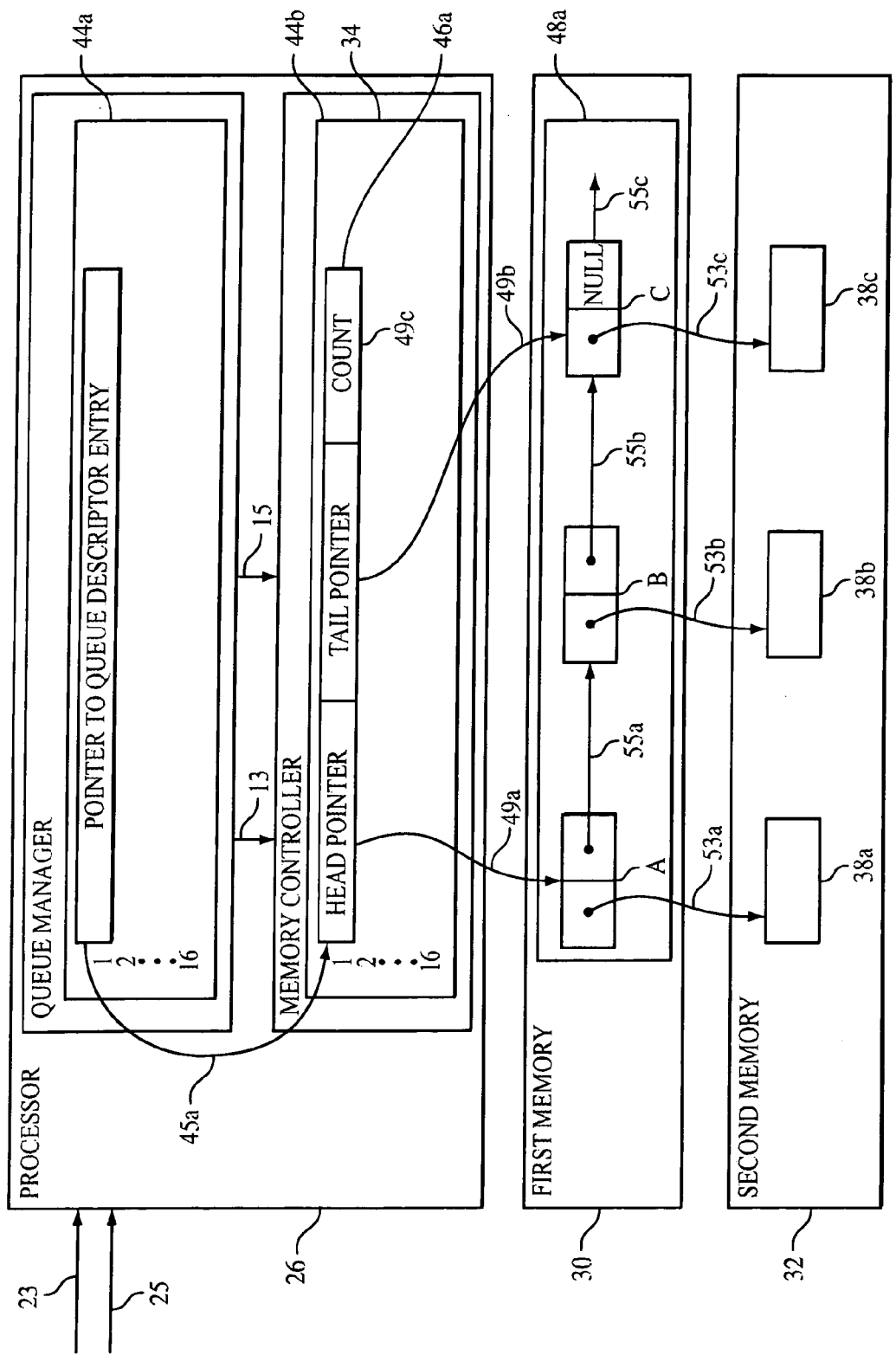
FIG. 3 is a block diagram of a cache data structure to illustrate enqueue and dequeue operations.

Referring to FIG. 3, the operation of the cache is illustrated. In this example, the tag portion 44a can contain sixteen entries. For purposes of illustration only, the following discussion focuses on the first entry in the tag portion 44a. The first entry is associated with a pointer 45a that points to a MRU queue descriptor 46a residing in the data store portion 44b. The queue descriptor 46a is associated with a MRU queue 48a. The queue descriptor 46a includes a head pointer 49a pointing to the first buffer A and a tail pointer 49b pointing to the last buffer C. An optional count field 49c maintains the number of buffers in the queue of buffers 48a. In this case the count field 49c is set to the value "3" representing the buffers A, B and C. As discussed in further detail below, the head pointer 49a, the tail pointer 49b and the count field 49c may be modified in response to enqueue requests and dequeue requests.

Each buffer in the queue 48a, such as a first buffer A, includes a pointer 53a to a data buffer 38a in the second memory 32. Additionally, a buffer pointer 55a points to a next ordered buffer B. The buffer pointer 55c associated with the last buffer C has a value set to NULL to indicate that it is the last buffer in the queue 48*a*.

Figure 4:
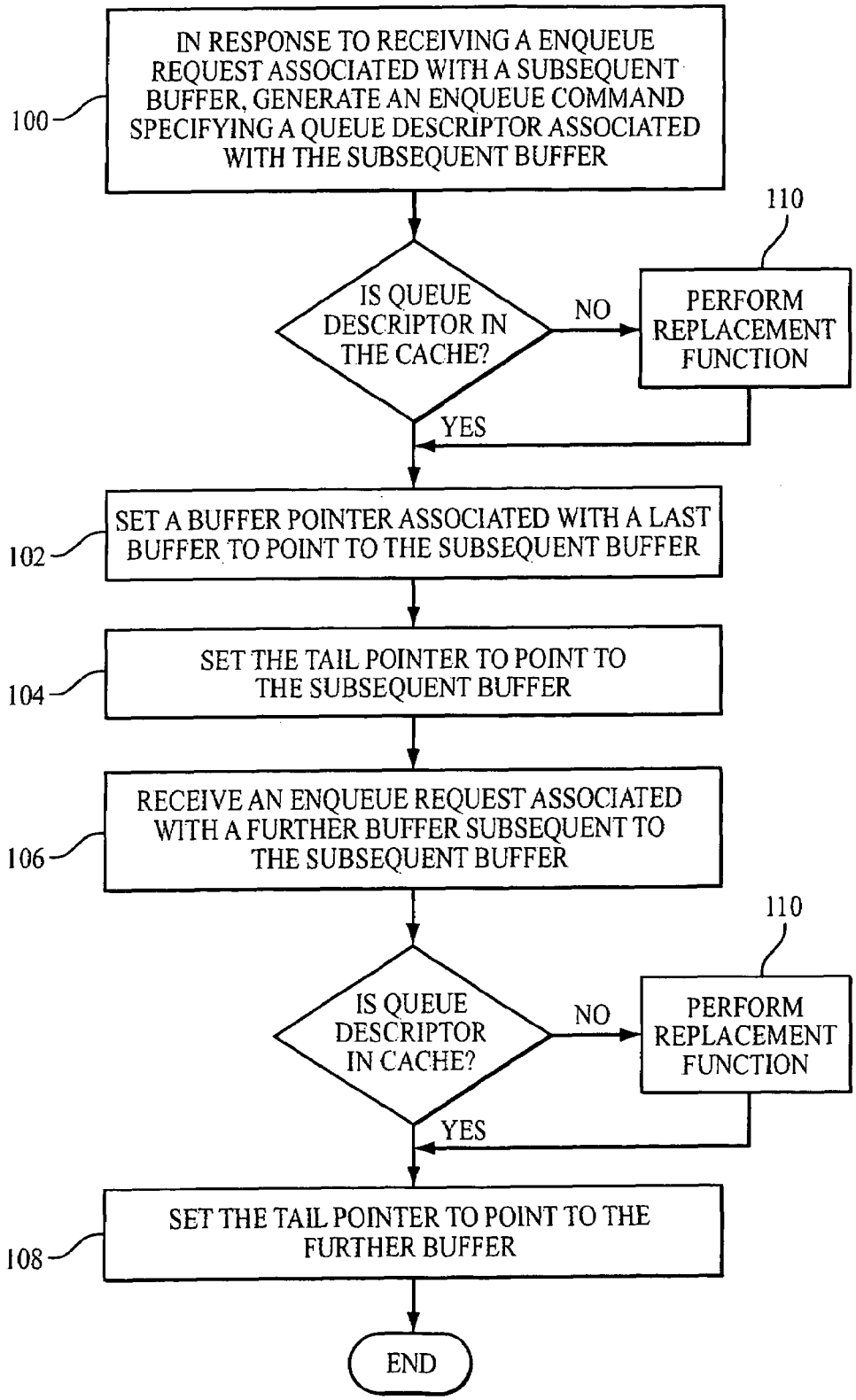
FIG. 4 illustrates the flow of enqueue requests to a queue.
Figure 5:
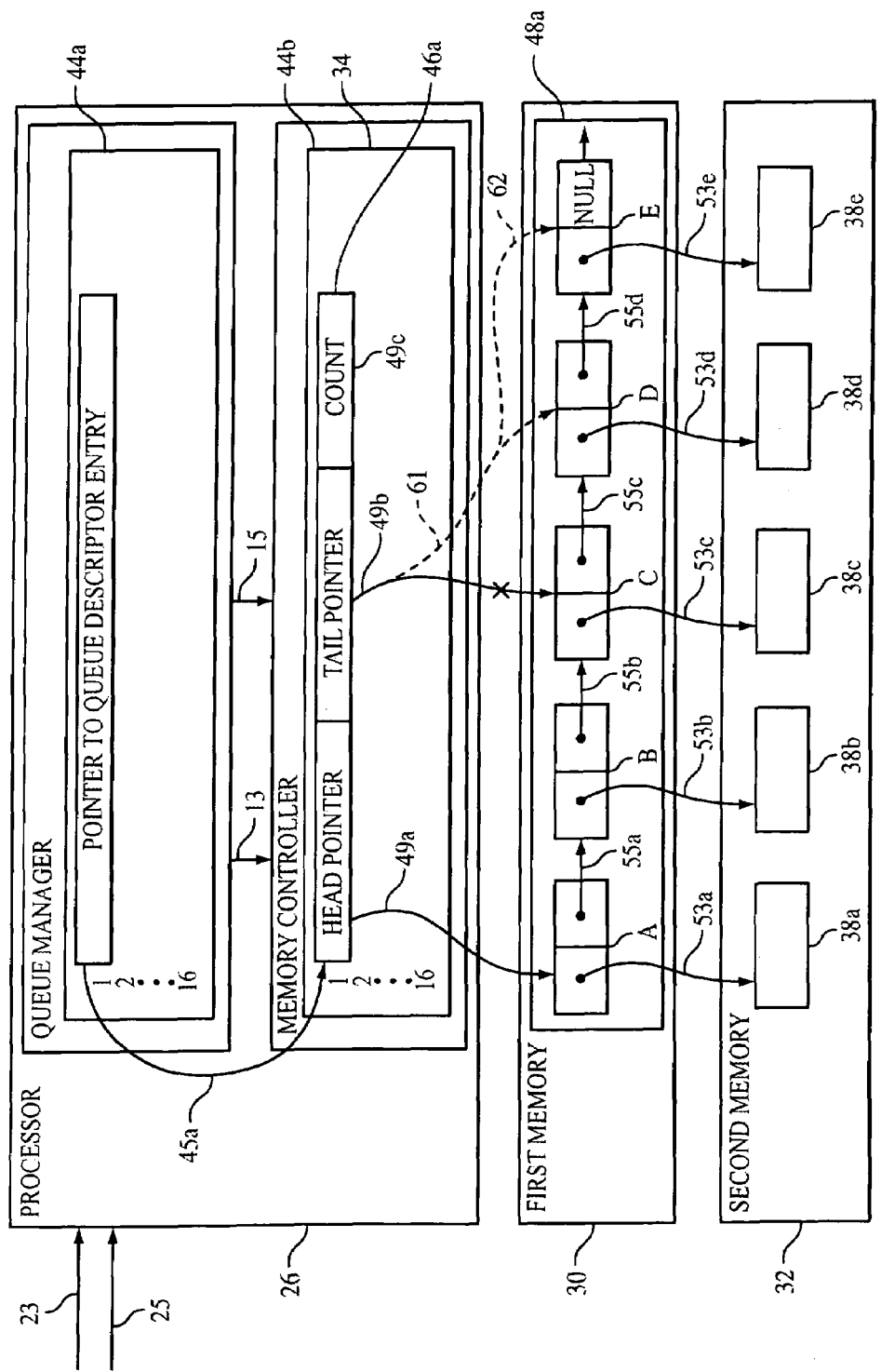
FIG. 5 is a block diagram showing an enqueue operation.

As shown in FIGS. 4 and 5, in response to the receiving an enqueue request 23, the queue manager 27 generates 100 an enqueue command 13 directed to the memory controller 34. In the illustrated example, the enqueue request 23 is associated with a subsequent data buffer 38*d* received after data buffer 38*c*. The enqueue request 23 includes information specifying the queue descriptor 46*a* and an address associated with the data buffer 38*d* residing in the second memory 32. The tail pointer 49*b* currently pointing to buffer C in the queue 48*a* is returned to the queue manager 27. The enqueue request 23 is evaluated to determine whether the queue descriptor associated with the enqueue request is currently in the data store portion 44*b*. If it is not, then a replacement function is performed 110. The replacement function is discussed further below.

The buffer pointer 55*c* associated with buffer C currently contains a NULL value indicating that it is the last buffer in the queue 48*a*. The buffer pointer 55*c* is set 102 to point to the subsequent buffer D. That is accomplished by setting the buffer pointer 55*c* to the address of the buffer D.

Once the buffer pointer 55*c* has been set, the tail pointer 49*b* is set 104 to point to buffer D as indicated by dashed line 61. This also may be accomplished by setting the tail pointer to the address of the buffer D. Since buffer D is now the last buffer in the queue 48*a*, the value of the buffer pointer 55*d* is set to the NULL value. Moreover, the value in the count field 49*c* is updated to "4" to reflect the number of buffers in the queue 48*a*. As a result, the buffer D is added to the queue 48*a* by using the queue descriptor 46*a* residing in the data store portion 44*b*.

The processor 18 can receive 106 a subsequent enqueue request associated with the same queue descriptor 46*a* and queue 48*a*. For example, it is assumed that the queue manager 27 receives a subsequent enqueue request associated with a newly arrived data buffer 38*e*. It also is assumed that the data buffer 38*e* is associated with the queue descriptor 46*a*. The tail pointer 49*b* can be set 108 to point to buffer E. That is represented by the dashed line 62 pointing to buffer E. The tail pointer 49*b* is updated without having to retrieve it because it is already in the data store portion 44*b*. As a result, the latency of back-to-back enqueue operations to the same queue of buffers can be reduced. Hence, the queue manager can manage requests to a large number of queues as well as successive requests to only a few queues or to a single queue. Additionally, the queue manager 27 issues commands indicating to the memory controller 34 which of the multiple data store portion entries to use to perform the command.

In some situations, however, none of the queue descriptors 46*a* currently occupying the data store portion 44*b* is associated with the newly arrived data buffer 38*e*. In that case, the processor performs 110 a replacement function removes a particular queue descriptor from the data store portion 44*b* according to a replacement policy. The replacement policy can include, for example, using a LRU policy in which a queue descriptor that has not been accessed during a predetermined time period is removed from the data store portion 44*b*. The removed queue descriptor is written back to the first memory 30. As discussed above, the removed queue descriptor is replaced with the queue descriptor associated with data buffer 38*e*. Once the replacement function is completed, queue operations associated with the enqueue request are performed as previously discussed above.

Figure 6:
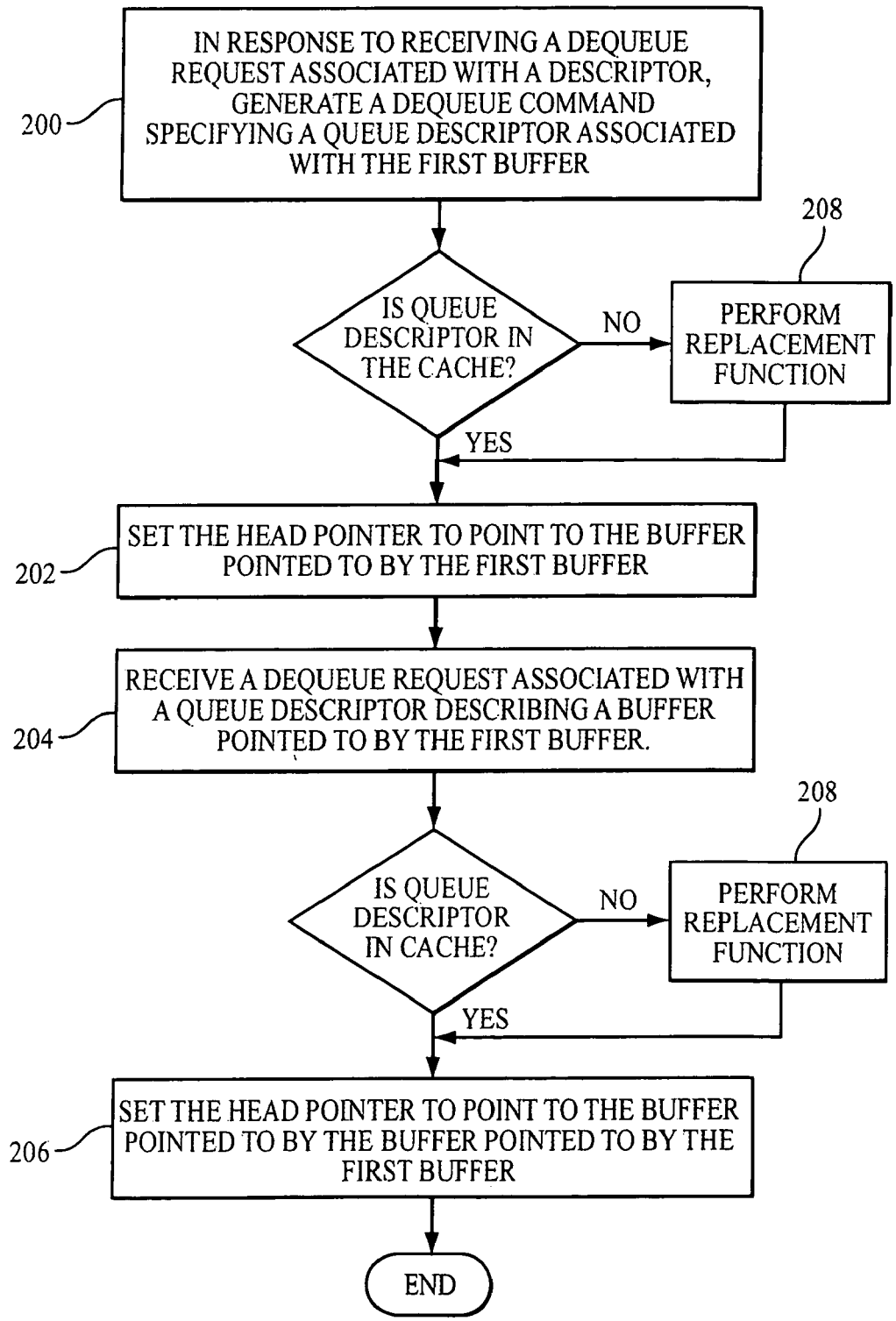
FIG. 6 illustrates the flow of dequeue requests to a queue.
Figure 7:
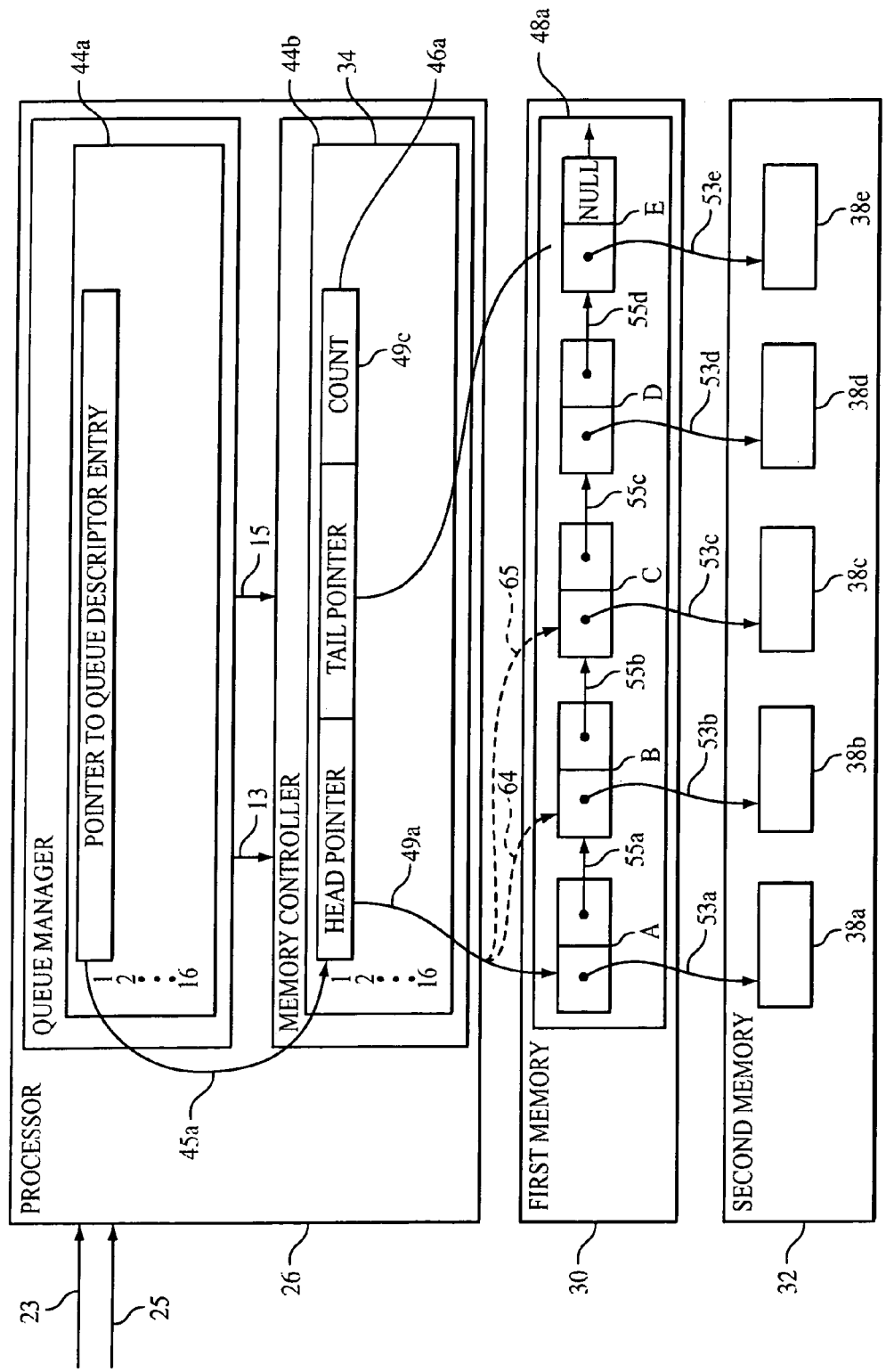
FIG. 7 is a block diagram showing a dequeue operation.

As shown in FIGS. 6 and 7, in response to receiving 200 a dequeue request, the queue manager 27 generates 200 a dequeue 15 command directed to the memory controller 34. In this example, the dequeue request is associated with the queue descriptor 46*a* and represents a request to retrieve the data buffer 38*a* from the second memory 32. Once the data buffer 38*a* is retrieved, it can be transmitted from the second memory 32 to the transmit buffer 36. The dequeue request 25 includes information specifying the queue descriptor 46*a*. The head pointer 49*a* of the queue descriptor 46*a* points to the first buffer A which in turn points to data buffer 38*a*. As a result, the data buffer 38*a* is returned to the queue manager 27.

The head pointer 49*a* is set 202 to point to the next buffer B in the queue 48*a* as indicated by the dashed line 64. That can be accomplished by setting the head pointer 49*a* to the address of buffer B. The value in the count field 49*c* is updated to "4", reflecting the remaining number of buffers (B through E). As a result, the data buffer 38*a* is retrieved from the queue 48*a* by using the queue descriptor 46*a* residing in the data store portion 44*b*.

The queue manager 27 can receive 204 subsequent dequeue requests 25 associated with the same queue descriptor 46*a*. It is assumed, for example, that the queue manager 27 receives a further dequeue request 25 associated with the queue descriptor 46*a*. As indicated by the dashed line 64, the head pointer 46*a* currently points to buffer B which is now the first buffer because the reference to buffer A was removed. It also is assumed that the data buffer B is associated with queue descriptor 46*a*. The head pointer 49*a* can be set 206 to point to buffer C, as indicated by a dashed line 65, without having to retrieve the head pointer 49*a* because it is already in the data store portion 44*b*. As a result, the latency of back-to-back dequeue operations to the same queue of buffers can be reduced.

In some situations, however, the queue descriptor 46*a* currently occupying an entry of the data store portion 44*b* is not associated with the data buffer 38*b*. In that case, the processor performs 208 a replacement function similar to the one discussed above. Once the replacement function has been completed, operations associated with the dequeue request are performed as previously discussed above.

The cache of queue descriptors can be implemented in a distributed manner such that the tag portion 44*a* resides in the memory controller 34 and the data store portion 44*b* resides in the first memory 30. Data buffers 38 that are received from the receive buffer 20 can be processed quickly. For example, the second of a pair of dequeue commands can be started once the head pointer for that queue descriptor is updated as a result of the first dequeue memory read of the head pointer. Similarly, the second of a pair of enqueue commands can be started once the tail pointer for that queue descriptor is updated as a result of the first enqueue memory read of the tail pointer. In addition, using a queue of buffers, such as a linked list of buffers, allows for a flexible approach to processing a large number of queues. Data buffers can be quickly enqueued to the queue of buffers and dequeued from the queue of buffers.

Various features of the system can be implemented in hardware, software, or a combination of hardware and software. For example, some aspects of the system can be implemented in computer programs executing on programmable computers. Each program can be implemented in a high level procedural or object-oriented programming language to communicate with a computer system. Furthermore, each such computer program can be stored on a storage medium, such as read-only-memory (ROM) readable by a general or special purpose programmable computer, for configuring and operating the computer when the storage medium is read by the computer to perform the functions described above.

Other embodiments are within the scope of the following claims.

What is claimed is:

1. An apparatus comprising:
a processing engine to make enqueue requests;
a scheduler to make dequeue requests;
a cache memory to store data describing a structure of a queue;
a memory controller to initiate queue commands; and
a queue manager including a content addressable memory to store a reference to data in the cache memory describing the structure of the queue, the queue manager configured to process the enqueue requests and the dequeue requests and capable of commencing processing a request to a queue while a previous request with respect to the same queue is being processed,
wherein the cache memory is distributed partially to the memory controller and
wherein the queue manager is configured to issue commands to return data describing the structure of the queue and to fetch data describing an updated structure of the queue from memory to ensure that data describing the structure of the queue stored in the cache memory is coherent with entries in the content addressable memory.

2. The apparatus of claim 1 further including memory to store data placed on a queue wherein the memory includes a linked list data structure.

3. The apparatus of claim 1 wherein the processing engine includes a plurality of multi-threaded pipelined programming engines, configured in a pipeline to receive, assemble, and classify data packets to determine an output queue for each packet and to make requests to the queue manager that specify the output queue.

4. The apparatus of claim 1 including a second plurality of multi-threaded pipelined programming engines, configured as a second pipeline to receive data from the queue manager and send data to a transmit buffer.

5. The apparatus of claim 1 wherein the scheduler includes multi-threaded pipelined programming engines, the scheduler configured to determine the order of packets to be removed from the queue and to store a bit for the queue indicating whether the queue is empty.

6. A system comprising:
a source of data packets;
a destination of data packets;
a device operating to transfer data packets from the source to the destination comprising:
a processing engine to make enqueue requests;
a scheduler to make dequeue requests;
a cache memory to store data describing a structure of a queue;
a memory controller to initiate queue commands; and
a queue manager including a content addressable memory to store a reference to data in the cache memory describing the structure of the queue, the queue manager configured to process the enqucue requests and the dequeue requests and capable of processing a request to a queue while a previous request with respect to the same queue is being processed; and
a memory adapted to store a queue of buffers wherein the cache memory are distributed partially to the memory adapted to store a ciueue of buffers
wherein the device is connected to a high line rate, and
further wherein the cache memory is distributed partially to the memory controller.

7. The system of claim 6 further including a memory to store data placed on a queue wherein the memory includes a linked list data structure.

8. The system of claim 6 wherein the processing engine includes a plurality of multi-threaded pipelined programming engines, configured in a pipeline to receive, assemble, and classify data packets to determine an output queue for each packet and to make requests to the queue manager that specify the output queue.

9. The system of claim 6 further including a second plurality of multi-threaded pipelined programming engines, configured as a second processing engine to receive data from the queue manager and send data to a transmit buffer.

10. The system of claim 6 wherein the scheduler includes multi-threaded pipelined programming engines, the scheduler configured to determine the order of packets to be removed from the queue and store a bit for each queue indicating whether the queue is empty.

11. The system of claim 6 wherein the queue manager is configured to issue commands to return data describing the structure of the queue and to fetch data describing an updated structure of the queue from memory to ensure that data describing the structure of the queue stored in the memory controller is coherent with the entries in the content addressable memory.

12. The apparatus of claim 1 wherein the cache memory are distributed partially to the queue manager.

13. The apparatus of claim 1 further including a memory adapted to store a queue of buffers wherein the cache memory are distributed partially to the memory adapted to store the queue of buffers.

14. The system of claim 6 wherein the cache memory are distributed partially to the queue manager.

* * * * *